(12) United States Patent
Chopin

(10) Patent No.: US 11,878,854 B2
(45) Date of Patent: *Jan. 23, 2024

(54) PROCESS FOR PREVENTING ORGANOLEPTIC DEGRADATION IN FLEXIBLY-PACKAGED SENSITIVE FOODS AND PACKAGED PRODUCTS THEREOF

(71) Applicant: Liqui-Box Corporation, Richmond, VA (US)

(72) Inventor: Lamy Chopin, Missouri City, TX (US)

(73) Assignee: Liqui-Box Corporation, Richmond, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/835,492

(22) Filed: Jun. 8, 2022

(65) Prior Publication Data

US 2023/0084886 A1    Mar. 16, 2023

Related U.S. Application Data

(63) Continuation of application No. 16/127,314, filed on Sep. 11, 2018, now Pat. No. 11,383,910.

(60) Provisional application No. 62/557,922, filed on Sep. 13, 2017.

(51) Int. Cl.
| | |
|---|---|
| *B65D 81/24* | (2006.01) |
| *B65D 85/72* | (2006.01) |
| *B32B 27/32* | (2006.01) |
| *B32B 27/18* | (2006.01) |
| *B32B 27/08* | (2006.01) |

(52) U.S. Cl.
CPC .............. *B65D 81/24* (2013.01); *B32B 27/08* (2013.01); *B32B 27/18* (2013.01); *B32B 27/32* (2013.01); *B65D 85/72* (2013.01); *B32B 2439/70* (2013.01); *Y10T 428/1324* (2015.01); *Y10T 428/1331* (2015.01); *Y10T 428/1359* (2015.01)

(58) Field of Classification Search
CPC ..... B32B 2439/70; B32B 27/08; B32B 27/18; B32B 27/32; B32B 15/082; B32B 15/085; B32B 15/088; B32B 15/09; B32B 15/20; B32B 2250/02; B32B 2250/03; B32B 2250/04; B32B 2250/05; B32B 2255/10; B32B 2255/20; B32B 2255/205; B32B 2270/00; B32B 2307/41; B32B 2307/516; B32B 2307/518; B32B 2307/546; B32B 2307/714; B32B 2307/7244; B32B 2307/7248; B32B 2307/732; B32B 2307/746; B32B 2307/75; B32B 23/04; B32B 23/042; B32B 23/08; B32B 2439/06; B32B 2439/46; B32B 27/20; B32B 27/304; B32B 27/306; B32B 27/325; B32B 27/327; B32B 27/34; B32B 27/36; B32B 3/08; B32B 3/266; B32B 7/12; B65D 81/24; B65D 85/72; Y10T 428/1324; Y10T 428/1331; Y10T 428/1359; C08J 2323/08; C08J 2483/04; C08J 5/18

See application file for complete search history.

(56) References Cited

U.S. PATENT DOCUMENTS

| | | |
|---|---|---|
| 3,173,579 A | 3/1965 | Curie et al. |
| 4,503,102 A | 3/1985 | Mollison |
| 4,521,437 A | 6/1985 | Storms |
| 4,796,788 A | 1/1989 | Bond |
| 5,206,075 A | 4/1993 | Hodgson, Jr. |
| 5,364,486 A | 11/1994 | Falla et al. |
| 5,508,051 A | 4/1996 | Falla et al. |
| 5,721,025 A | 2/1998 | Falla et al. |
| 5,879,768 A | 3/1999 | Falla et al. |
| 5,942,579 A | 8/1999 | Falla et al. |
| 5,972,443 A | 10/1999 | Breck et al. |
| 6,117,465 A | 9/2000 | Falla |
| 6,256,966 B1 | 7/2001 | Braun et al. |
| 6,406,765 B1 | 6/2002 | Braun et al. |
| 6,416,833 B1 | 7/2002 | Climenhage et al. |
| 6,602,609 B1 | 8/2003 | Kong |
| 6,767,599 B2 | 7/2004 | Braun et al. |
| 11,383,910 B2 * | 7/2022 | Chopin ............... B32B 7/12 |
| 2003/0039814 A1 | 2/2003 | Bader et al. |
| 2004/0151934 A1 | 8/2004 | Schwark |

(Continued)

FOREIGN PATENT DOCUMENTS

| | | |
|---|---|---|
| CN | 1142433 A | 2/1997 |
| CN | 101754853 A | 6/2010 |

(Continued)

OTHER PUBLICATIONS

Dow Corning Corp., Dow Corning Unveils Silicone Slip Masterbatch for Form-Fill-Seal Packaging, Additives for Polymers, 2016, vol. 2016, Issue 6, pp. 2-3.

*Primary Examiner* — Yan Lan

(74) *Attorney, Agent, or Firm* — McAndrews, Held & Malloy, Ltd.

(57) ABSTRACT

This invention relates to a process for reducing or eliminating organoleptic degradation in organoleptically sensitive foods packaged in flexible packaging, and packaged products thereof. This invention also relates to organoleptic flexible packaging made from polymeric films comprising oxidation-stable and non-migratory polysiloxane as slip additive. The oxidative-stability and non-migratory nature of the polysiloxane slip additive provides an organoleptic flexible packaging that is non-interactive with and inert to the organoleptically sensitive food packaged within, specifically: (1) coffee; (2) beer; (3) water; and (4) wine.

17 Claims, No Drawings

(56) References Cited

U.S. PATENT DOCUMENTS

| | | |
|---|---|---|
| 2004/9151834 | 8/2004 | Schwark et al. |
| 2005/0069660 A1 | 3/2005 | Climenhage |
| 2011/0097523 A1 | 4/2011 | Bernal-Lara et al. |
| 2016/0090477 A1 | 3/2016 | Roy et al. |

FOREIGN PATENT DOCUMENTS

| | | |
|---|---|---|
| CN | 103507364 A | 1/2014 |
| CN | 104684952 A | 6/2015 |
| JP | H0880977 A | 3/1996 |
| JP | 2006-518292 A | 8/2006 |
| JP | 2013154605 A | 7/2014 |
| WO | 2014014833 A1 | 1/2014 |

* cited by examiner

PROCESS FOR PREVENTING ORGANOLEPTIC DEGRADATION IN FLEXIBLY-PACKAGED SENSITIVE FOODS AND PACKAGED PRODUCTS THEREOF

CROSS REFERENCE TO RELATED APPLICATIONS

This application claims benefit under 35 U.S.C. § 119(e) of Provisional U.S. Patent Application No. 62/557,922, filed Sep. 13, 2017, the contents of which are hereby incorporated by reference in its entirety.

TECHNICAL FIELD

This invention relates to a process for reducing or eliminating organoleptic degradation in organoleptically sensitive foods packaged in flexible packaging, and packaged products thereof. This invention also relates to organoleptic flexible packaging made from polymeric films comprising oxidation-stable and non-migratory polysiloxane as slip additive. The oxidative-stability and non-migratory nature of the polysiloxane slip additive provides an organoleptic flexible packaging that is non-interactive with and inert to the organoleptically sensitive food packaged within, specifically: (1) coffee; (2) beer; (3) water; and (4) wine.

BACKGROUND

Polyolefin films used to package liquids are described in U.S. Pat. Nos. 4,503,102; 4,521,437; 5,206,075; 5,364,486; 5,508,051; 5,721,025; 5,879,768; 5,942,579; 5,972,443; 6,117,4656; 6256,966; 6,406,765; 6,416,833; and 6,767,599. These patents describe polymer blends used to manufacture flexible packages for packaging, including food packaging. These patents are incorporated herein by reference.

This application claims benefit under 35 U.S.C. § 119(e) of Provisional U.S. Patent Application No. 62/557,922, filed Sep. 13, 2017, the contents of which are hereby incorporated by reference in its entirety.

In the food packaging field, positive impact of packaging, that is, additive impact, or negative impact of packaging, that is, scalping, are undesirable outcomes. Stated another way, the packaging should be inert or neutral to, and non-interactive with, the food that is being packaged. Particularly, for sensitive products such as wine, or neutral products such as water, any changes in flavor profile caused by the package are particularly detrimental.

For flexible liquid packaging, certain additives provide excellent processability of the plastic films required to produce these packages. A common additive that reduces the coefficient of friction of the film is called 'slip additive.' Typical slip additives for polyethylene films include fatty acid amides. Fatty acid amides are not very soluble in the film and migrate to the surface of the film. The waxy layer of the fatty acid amides at the surface of the film acts to reduce the coefficient of friction of the film, thus improving its processability.

However, many of these fatty acid amides contain unsaturation, which is subject to chemical oxidation. Moreover, these fatty acid amides residing on the film surface and in direct contact with the liquid product have a tendency to migrate into the liquid. Oxidized fatty acid amides that migrate into the liquid products can produce rancid off-tastes in the product in contact with the film. This is particularly an issue for products that use oxidative additives such as ozone for sterilization, such as ozonated water, because the ozone oxidizes the fatty acid amides.

This invention addresses the above problem of degradation in the organoleptic properties of the packaged food products.

SUMMARY

This invention relates to preventing degradation of organoleptic properties in packaged foods in which preservation of organoleptic properties is important. This invention also relates to such packaged foods that show lower tendency to degrade their organoleptic properties.

This invention relates to a process for reducing organoleptic degradation in food packaged in flexible packaging, said process comprising providing said flexible packaging, wherein said flexible packaging is made from film comprising polyethylene, wherein said polyethylene comprises at least one oxidation-resistant slip additive.

In one embodiment, this invention also relates to processes described herein, wherein said food is organoleptically-sensitive food. In yet another embodiment, this invention relates to the processes described herein, wherein said organoleptically sensitive food is a liquid. In one embodiment, this invention relates to processes above, wherein said liquid is coffee, wine, water, or beer.

In one embodiment, this invention relates to the above processes, wherein said flexible packaging is a pouch, a bag, or a bag-in-box. In yet another embodiment, the oxidation-resistant slip additive comprises polysiloxane, for example, a masterbatch comprising polyethylene with ultra-high molecular weight siloxane polymer dispersed in it.

In one embodiment, the present invention relates to the processes described above, wherein said film comprising polyethylene comprises more than one layer. In another embodiment, the oxidation-resistant slip additive is added to the outside layer of the multi-layer film. In yet another embodiment, the polyethylene comprises LLDPE. In one embodiment, the film does not include an organic slip additive.

This invention also relates to a packaged food, comprising organoleptically-sensitive food, wherein said organoleptically-sensitive food is packaged in a flexible packaging, wherein said flexible packaging is made from film comprising polyethylene, wherein said polyethylene comprises at least one oxidation-resistant slip additive. In one embodiment, the organoleptically sensitive food is a liquid. In yet another embodiment, said liquid is wine, water, beer, or a non-alcoholic beverage.

In one embodiment, the invention relates to a packaged food above, wherein said flexible packaging is a pouch, a bag, or a bag-in-box. In another embodiment, the invention relates to the packaged food described above, wherein said oxidation-resistant slip additive comprises a polysiloxane polymer, for example, a masterbatch comprising polyethylene with ultra-high molecular weight siloxane polymer dispersed in it.

In one embodiment, the present invention relates to the packaged food described above, wherein said film comprising polyethylene comprises more than one layer. In another embodiment, the oxidation-resistant slip additive is added to the outside layer of the multi-layer film. In yet another embodiment, the polyethylene comprises LLDPE. In one embodiment, the film does not include an organic slip additive.

DETAILED DESCRIPTION OF ILLUSTRATIVE EMBODIMENTS

Ranges are used herein in shorthand, to avoid having to list and describe each value within the range. For example, any appropriate value within the range can be selected as the upper value, lower value, or the terminus of the range.

As used herein, the singular form of a word includes the plural, and vice versa, unless the context clearly dictates otherwise. Thus, the references "a," "an," and "the" are generally inclusive of the plurals of the respective terms. For example, reference to "a method" includes a plurality of such "methods." Likewise, the terms "include," "including," and "or" should all be construed to be inclusive, unless such a construction is clearly prohibited from the context. Similarly, the term "examples," particularly when followed by a listing of terms, is merely exemplary or illustrative and should not be deemed exclusive or comprehensive.

The term "comprising" is intended to include embodiments encompassed by the terms "consisting essentially of" and "consisting of." Similarly, the term "consisting essentially of" is intended to include embodiments encompassed by the term "consisting of."

The methods and compositions and other advances disclosed herein are not limited to particular equipment or processes described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

This invention relates to flowable food products and non-flowable food products that are organoleptically-sensitive foods. Organoloeptically-sensitive food is defined infra.

As used herein, the term "flowable product" encompasses materials that are flowable under gravity or may be pumped. Flowable product includes a fluid, a liquid, a semi-liquid, a paste, and a combination thereof, with or without particulates in them. Flowable product includes food products. Such materials include liquids, for example, milk, water, juice, fruit juice, oil; emulsions, for example, ice-cream mix, soft margarine; pastes, for example, meat pastes, cheese, sauce, and peanut butter; preserves, for example, jams, pie fillings, and marmalade; jellies; doughs; ground meat, for example, sausage meat; powders, for example, gelatin powders; granular solids, for example, nuts, sugar, and salt; puree; concentrates; mixes; and such materials. The invention described herein is particularly useful for flowable foods.

By non-flowable products is meant, generally larger solids, for example solids that are not considered particles or particulate matter. While this invention applies both to flowable products and non-flowable products, the invention is discussed in terms of flowable products. The discussion applies equally to non-flowable products as well.

By "organoleptic properties" is meant the aspects of food that relate to the senses of taste, sight, smell, and touch.

By "organoleptically-sensitive food" is meant such food, in which, preservation of the organoleptic profile is important. Such food can be solid, liquid, paste, or a blend of solid and liquid. Preferably, the "organoleptically-sensitive food" is a liquid. In one embodiment, organoleptically-sensitive food in the present invention relates to coffee, beer, water, and wine.

By "flexible container" or "flexible packaging" is meant packaging for food items that generally is made from polymeric films, such as polyethylene films. Such films can have one layer or multiple layers. The walls of the flexible container can have one film (comprising one or multiple layers) or multiple films (each film comprising one or multiple layers). In the present disclosure, "flexible container" and "flexible packaging" should be understood as interchangeable terminology.

By "organoleptic flexible container" is meant a flexible container that is usable for organoleptically-sensitive foods, wherein the organoleptic properties of the packaged foods are retained, or in other words, the degradation of these properties is reduced or eliminated. As it relates to the present invention, such organoleptic flexible container is made from polymeric films, such as polyethylene films, wherein the slip additive used in making the films for the organoleptic flexible container comprises polysiloxanes.

In this specification, the terms "prevention of organoleptic degradation," "reduction in organoleptic degradation," and "elimination of organoleptic degradation" are used interchangeably.

By a "bag-in-box" or BiB is meant a type of flexible container for the storage and transportation of liquids. It consists of a strong bladder (or plastic bag), usually made of several layers of polymeric film, seated inside a corrugated fiberboard box. The bag is supplied to the filler company, which will then fill the empty pre-made bag. The company filling the bag with its product generally removes the tap, fills the bag (for example, with wine) and replaces the tap and then the bag is placed in the box. The bags are available as singles for semi-automatic machines or as web bags, where the bags have perforations between each one. These are used on automated filling systems where the bag is separated on line either before the bag is automatically filled or after. Depending on the end use there are a number of options that can be used on the bag instead of the tap. The bags can be filled from chilled product temperatures up to 85° C.

Bag-in-box packaging can be made using vertical form, fill, seal machine (VFFS machine) technology, where the bags are manufactured on-line from reels of film, then the FlexTap is inserted then filled on an integral rotary head filler.

Polysiloxane Slip Additive

The organoleptic flexible containers of the present invention, such as the bag-in-box container, are made from polymeric films, which specifically use polysiloxanes and slip additive, as opposed to a fatty acid amide.

Chemically, silicone polymers are extremely robust and have little or no tendency to oxidize under normally occurring conditions for food packaging. Thus, they are ideal candidates for modifying films used for organoleptically-sensitive food products.

Film formulations utilizing common slip agents suffer from a tendency to add off-tastes to sensitive products such as wine and water. It is highly desirable to have a flexible container made from polymeric film formulation that has the advantages of low coefficient-of-friction (COF) but without the disadvantage of off tastes. Moreover, other slip additives have a tendency to migrate into the organoleptically-sensitive food products. The tendency of slip additives to oxidize and migrate into the food can create rancid off-taste and/or reduce the quality and taste of the organoleptically sensitive packaged food. Silicone polymer additives provide a solution to this problem.

Fatty acid amides as slip additives precisely create this problem in organoleptic properties of taste and odor. Fatty acid amides used as slip agents for polyethylene films are made by amination of fatty acids from natural sources such as beef tallow and plant oils. For example, a well-known slip agent for polyethylene is erucamide (CAS 112-84-5), a 22-carbon structure with one unsaturation. Other common amides used for polymer modification are behenamide and stearamide. Similar to their fatty acid parents, these amides are subject to oxidation, resulting in 'rancid' off-tastes, which are particularly noticeable in neutral or sensitive contents such as water and wine. The oxidation may take place via normal aging of the film or may be a result of oxidative processes used in filling (e.g. ozonation).

Silicone polymers or polysiloxanes, which consist of a backbone of Si—O units, are extremely robust to oxidation. High molecular weight siloxane polymers for modifying the surface friction of PE films can provide adequate reduction of the film COF while avoiding the issues with the more traditional fatty acid amides. Packaging organoleptically-sensitive food products in flexible containers made with films comprising polysiloxanes slip additives retains the organoleptic properties of the food products being packaged, more specifically: coffee, beer, water, and wine. Water includes ozonated water.

Using the polysiloxane slip additive such as MB25-35 from Dow Chemical Co. provides PE films to allow for good processing, robust and flex-crack resistant bags, but avoiding the negative impacts on organoleptically-sensitive food products. In addition to the oxidation stability, the high molecular weight of the siloxanes means that they will not migrate into the product.

In one embodiment, the present invention provides (1) a process for making an organoleptic flexible container, and (2) said organoleptic flexible container produced from said process.

In another embodiment, the present invention relates to organoleptically-sensitive food packaged in an organoleptic flexible container. In one embodiment, this invention relates to the process of making such finished food package. Stated another way, in another embodiment, the present invention also provides an organoleptic flexible container that comprises one of the four organoleptically sensitive foods, namely: (1) coffee; (2) beer; (3) water; and (4) wine.

In one embodiment, the present invention relates to the process of making an organoleptic flexible container, that is a "bag-in-box" or a pouch (See description, for example, in U.S. Pat. Nos. 4,796,788 and 3,173,579, both of which are incorporated by reference herein).

In one embodiment, the present invention relates to the process of making organoleptic flexible container, said process includes, for example, (A) providing a flexible container with four panels of polymeric films that exhibit organoleptic properties. In one embodiment, the four panels form (i) a body portion; (ii) a neck portion, and a flare portion that extends from the neck portion; (iii) a tapered transition portion between the body portion and the neck portion; and (iv) the neck portion has a reduced width, the flare portion has an expanded end; and the width of the flare portion gradually increases from the neck portion to the flare expanded end (i.e., the expanded end of the flare portion). The process includes (B) inserting a fitment into the flare portion from the expanded end.

Organoleptic Flexible Container

The process includes providing an organoleptic flexible container. In one embodiment, the flexible container is made from four panels. During the fabrication process, the panels are formed when one or more webs of film material are sealed together. Similarly, one, two, or more webs may be used to produce each respective panel (i.e., a bag-in-a-bag configuration or a bladder configuration). Similarly, multi-layer films can also be prepared.

In one embodiment, the four panels can each be composed of a separate web of film material. The composition and structure for each web of film material can be the same or different. Alternatively, one web of film material may also be used to make all four panels and the top and bottom segments. In a further embodiment, two or more webs can be used to make each panel.

The material of construction of the organoleptic flexible container can comprise food-grade plastic. For instance, nylon, polypropylene, polyethylene such as linear low-density polyethylene (LLDPE), high-density polyethylene (HDPE) and/or low density polyethylene (LDPE) may be used as discussed later. The film of the organoleptic flexible container can have a thickness and barrier properties that is adequate to maintain product and package integrity during manufacturing, distribution, product shelf life and customer usage.

In an embodiment, the flexible multilayer film has a thickness from 100 micrometers, or 200 micrometers, or 250 micrometers to 300 micrometers, or 350 micrometers, or 400 micrometers. In an embodiment, the film material provides the appropriate atmosphere within the flexible container to maintain the product shelf life of at least about 180 days. Moreover, it may be desirable to use materials of construction having oil and/or chemical resistance particularly in the seal layer, but not limited to just the seal layer. The flexible multilayer film can be either printable or compatible to receive a pressure sensitive label or other type of label for displaying of indicia on the flexible container.

In an embodiment, each panel is made from a flexible multilayer film having at least one, or at least two, or at least three layers. The flexible multilayer film is resilient, flexible, deformable, and pliable. The structure and composition of the flexible multilayer film for each panel may be the same or different. For example, each of the four panels can be made from a separate web, each web having a unique structure and/or unique composition, finish, or print. Alternatively, each of the four panels can be the same structure and the same composition. In an embodiment, each panel is a flexible multilayer film having the same structure and the same composition.

The flexible multilayer film may be (i) a coextruded multilayer structure or (ii) a laminate, or (iii) a combination of (i) and (ii). In an embodiment, the flexible multilayer film has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or ten, or eleven, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

In another embodiment, the flexible multilayer film can comprise a bladder wherein two or more films that are adhered in such a manner as to allow some delamination of one or more plies to occur during a significant impact such that the inside film maintains integrity and continues to hold contents of the container.

Nonlimiting examples of suitable polymeric materials for the seal layer include olefin-based polymer (including any ethylene/$C_3$-$C_{10}$ alpha-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene ("HDPE"), low density polyethylene ("LDPE"), linear low density polyethylene ("LLDPE"), medium density polyethylene ("MDPE"), ethylene-acrylic acid or ethylene-methacrylic acid and their ionomers with zinc, sodium, lithium, potassium, magnesium salts, ethylene vinyl acetate copolymers and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, propylene-based plastomers (e.g., VERSIFY' or VISTAMAX')), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene (e.g., LLDPE based on ethylene octene copolymer such as DOWLEX™, blends thereof, and multilayer combinations thereof.

Nonlimiting examples of suitable polymeric materials for tie layer include functionalized ethylene-based polymers such as ethylene-vinyl acetate ("EVA"), polymers with maleic anhydride-grafted to polyolefins such as any polyethylene, ethylene-copolymers, or polypropylene, and ethylene acrylate copolymers such an ethylene methyl acrylate ("EMA"), glycidyl containing ethylene copolymers, propylene and ethylene based olefin block copolymers INFUSE™, Olefin Block Copolymers available for the Dow Chemical Company and INTUNE™ (PP-based Olefin Block Copolymers available from The Dow Chemical Company) and blends thereof.

The flexible multilayer film may include additional layers, which may contribute to the structural integrity or provide specific properties. The additional layers may be added by direct means or by using appropriate tie layers to the adjacent polymer layers. Polymers, which may provide additional mechanical performance such as stiffness or opacity, as well polymers, which may offer, gas barrier properties or chemical resistance can be added to the structure.

Nonlimiting examples of suitable material for the optional barrier layer include copolymers of vinylidene chloride and methyl acrylate, methyl methacrylate or vinylidene chloride (e.g., SARAN resins available from The Dow Chemical Company); vinylethylene vinyl alcohol (EVOH), metal foil (such as aluminum foil). Alternatively, modified polymeric films such as vapor deposited aluminum or silicon oxide on such films as BON, OPET, or OPP, can be used to obtain barrier properties when used in laminate multilayer film.

In an embodiment, the flexible multilayer film includes a seal layer selected from LLDPE (sold under the trade name DOWLEX™ (The Dow Chemical Company)), single-site LLDPE substantially linear, or linear ethylene alpha-olefin copolymers, including polymers sold under the trade name AFFINITY™ or ELITE™ (The Dow Chemical Company) for example, propylene-based plastomers or elastomers such as VERSIFY™ (The Dow Chemical Company), and blends thereof. An optional tie layer is selected from either ethylene-based olefin block copolymer PE-OBC (sold as INFUSE™) or propylene-based olefin block copolymer PP-OBC (sold as INTUNE™). The outer layer includes greater than 50 wt. % of resin(s) having a melting point, $T_m$, that is from 25° C., to 30° C., or 40° C. or higher than the melting point of the polymer in the seal layer wherein the outer layer polymer is selected from resins such as VERSIFY or VISTAMAX, ELITE™, HDPE or a propylene-based polymer such as propylene homopolymer, propylene impact copolymer or TPO.

In an embodiment, the flexible multilayer film is co-extruded.

In an embodiment, flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY' or ELITE™ (The Dow Chemical Company) for example, propylene-based plastomers or elastomers such as VERSIFY™ (The Dow Chemical Company), and blends thereof. The flexible multilayer film also includes an outer layer that is a polyamide.

In an embodiment, the flexible multilayer film is a coextruded film and includes:
(i) a seal layer composed of an olefin-based polymer having a first melt temperature less than 105° C., (Tm1); and
(ii) an outer layer composed of a polymeric material having a second melt temperature, (Tm2), wherein Tm2−Tm1>40° C.

The term "$T_{m2}-T_{m1}$" is the difference between the melt temperature of the polymer in the outer layer and the melt temperature of the polymer in the seal layer, and is also referred to as $\Delta T_m$. In an embodiment, the $\Delta T_m$ is from 41° C., or 50° C., or 75° C., or 100° C., to 125° C., or 150° C., or 175° C., or 200° C.

In an embodiment, the flexible multilayer film is a coextruded film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a $T_m$ from 55° C. to 115° C. and a density from 0.865 to 0.925 g/cm$^3$, or from 0.875 to 0.910 g/cm$^3$, or from 0.888 to 0.900 g/cm$^3$ and the outer layer is composed of a polyamide having a $T_m$ from 170° C. to 270° C. In an embodiment, the flexible multilayer film is a coextruded film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a $T_m$ from 55° C. to 115° C. and density from 0.865 to 0.925 g/cm$^3$, or from 0.875 to 0.910 g/cm$^3$, or from 0.888 to 0.900 g/cm$^3$ and an outermost layer composed of a polyamide having a $T_m$ from 170° C. to 270° C.

In an embodiment, the flexible multilayer film is a coextruded film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a $T_m$ from 55° C. to 115° C. and density from 0.865 to 0.925 g/cm$^3$, or from 0.875 to 0.910 g/cm$^3$, or from 0.888 to 0.900 g/cm$^3$. The outer layer is a polyamide having a $T_m$ from 170° C. to 270° C.

In an embodiment, the flexible multilayer film is a coextruded five layer film, or a coextruded seven layer film having at least two layers containing an ethylene-based polymer. The ethylene-based polymer may be the same or different in each layer.

In an embodiment, the flexible multilayer film is a coextruded five layer, or a coextruded seven layer film having at least two layers containing a polyamide polymer.

In an embodiment, the flexible multilayer film is a seven-layer coextruded film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a $T_m$ from 90° C. to 104° C. The outer layer is a polyamide having a $T_m$ from 170° C. to 270° C. The film has a $\Delta T_m$ from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

In an embodiment, the flexible container has a volume from 0.050 liters (L), or 0.1 L, or 0.15 L, or 0.2 L, or 0.25 liters (L), or 0.5 L, or 0.75 L, or 1.0 L, or 1.5 L, or 2.5 L, or 3 L, or 3.5 L, or 4.0 L, or 4.5 L, or 5.0 L to 6.0 L, or 7.0 L, or 8.0 L, or 9.0 L, or 10.0 L, or 20 L, or 30 L.

The organoleptic flexible container is used to store flowable substances, namely, coffee, beer, water, or wine. Water includes ozonated water.

What is claimed is:

1. A packaged organoleptically-sensitive food with reduced organoleptic degradation, comprising organoleptically-sensitive food packaged in an organoleptically-neutral flexible container, wherein said organoleptically-neutral flexible container is made from a multi-layer film comprising an outer layer and polyethylene as a food contact sealant layer, wherein said food contact sealant layer consists of a polyethylene and an oxidation-resistant and non-migratory slip additive ultra-high molecular weight polydimethylsiloxane.

2. The packaged organoleptically-sensitive food as recited in claim 1, wherein said organoleptically sensitive food is a liquid.

3. The packaged organoleptically-sensitive food as recited in claim 2, wherein said liquid is coffee, beer, water, or wine.

4. The packaged organoleptically-sensitive food as recited in claim 1, wherein said flexible container is a pouch, a bag, or a bag-in-box.

5. The packaged organoleptically-sensitive food as recited in claim 1, wherein said oxidation-resistant and non-migratory slip additive ultra-high molecular weight polydimethylsiloxane is a masterbatch comprising a low density polyethylene with 25% ultra-high molecular weight polydimethylsiloxane dispersed in it.

6. The packaged organoleptically-sensitive food as recited in claim 1, wherein said polyethylene comprises LLDPE.

7. The packaged organoleptically-sensitive food as recited in claim 1, wherein said film does not include a fatty acid amide slip additive.

8. The packaged organoleptically-sensitive food as recited in claim 1, wherein said outside layer of the multi-layer film comprises an oxidation-resistant and non-migratory slip additive ultra-high molecular weight polydimethylsiloxane.

9. A process for reducing organoleptic degradation in a packaged food, said process comprising providing an organoleptically-neutral flexible container, wherein said organoleptically-neutral flexible container is made from a multi-layer film comprising an outer layer and polyethylene as a food contact sealant layer, wherein said food contact sealant layer consists of a polyethylene and an oxidation-resistant and non-migratory slip additive ultra-high molecular weight polydimethylsiloxane, and packaging food in said organoleptically-neutral flexible container.

10. The process as recited in claim 9, wherein said food is organoleptically-sensitive food.

11. The process as recited in claim 10, wherein said organoleptically-sensitive food is a liquid.

12. The process as recited in claim 11, wherein said liquid is coffee, beer, water, or wine.

13. The process as recited in claim 9, wherein said flexible packaging is a pouch, a bag, or a bag-in-box.

14. The process as recited in claim 9, wherein said oxidation-resistant and non-migratory slip additive ultra-high molecular weight polydimethylsiloxane is a masterbatch comprising a low density polyethylene with 25% ultra-high molecular weight polydimethylsiloxane dispersed in it.

15. The process as recited in claim 9, wherein said outside layer of the multi-layer film comprises an oxidation-resistant and non-migratory slip additive ultra-high molecular weight polydimethylsiloxane.

16. The process as recited in claim 9, wherein said polyethylene comprises LLDPE.

17. The process as recited in claim 9, wherein said film does not include a fatty acid amide slip additive.

* * * * *